T. J. WILLETT.
AUTOMOBILE AND VEHICLE LOCKING DEVICE.
APPLICATION FILED NOV. 6, 1919.
1,416,393.  Patented May 16, 1922.
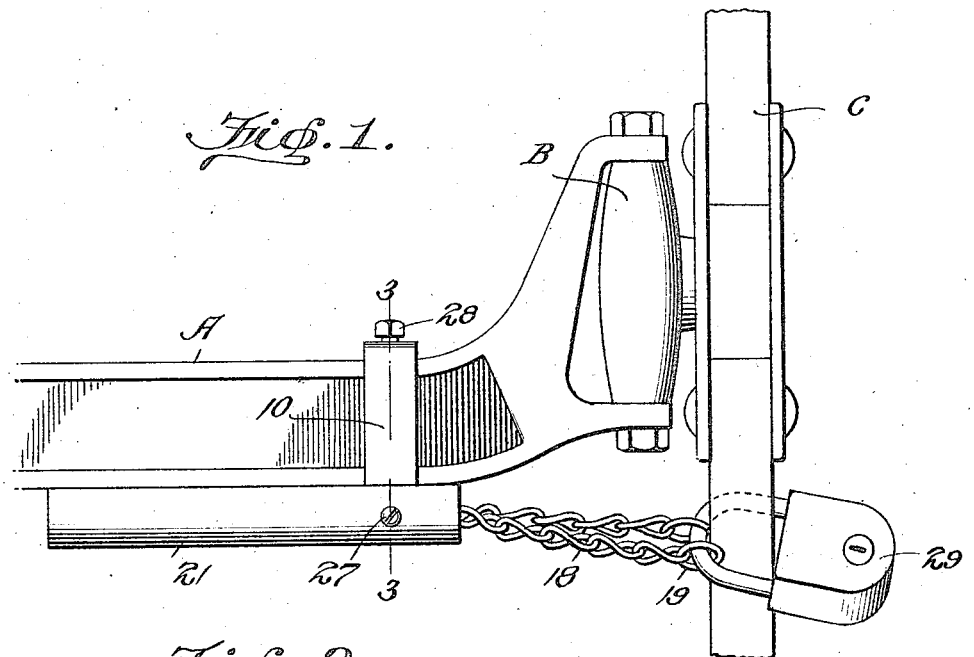
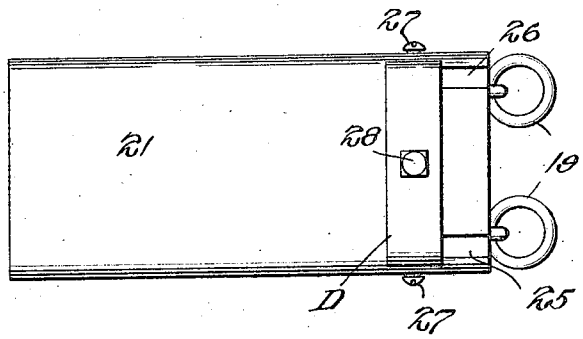
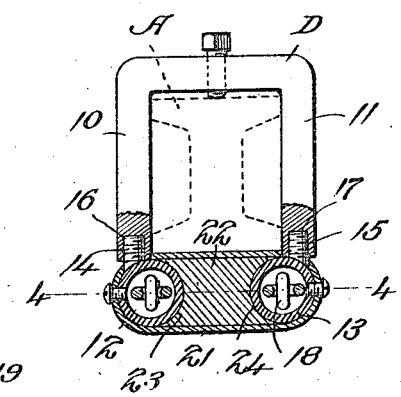
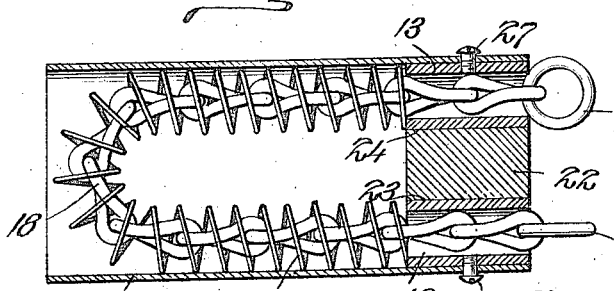
Inventor
Tomaso J. Willett,
By Henry T. Bright
Attorney

UNITED STATES PATENT OFFICE.

TOMASO J. WILLETT, OF LOUISVILLE, KENTUCKY.

AUTOMOBILE AND VEHICLE LOCKING DEVICE.

1,416,393.

Specification of Letters Patent.  Patented May 16, 1922.

Application filed November 6, 1919. Serial No. 336,175.

*To all whom it may concern:*

Be it known that I, TOMASO J. WILLETT, a citizen of the United States, residing at Louisville, in the county of Jefferson and State of Kentucky, have invented a new and useful Automobile and Vehicle Locking Device, of which the following is a specification.

My invention relates to vehicle locks and while it is applicable to various forms of vehicles it is particularly adapted for use in connection with automobiles.

It is my purpose to provide a lock of this type which will be efficient in use, simple in construction, relatively cheap to manufacture, easily applied to a vehicle, and when so applied easily operated to effect the locked and unlocked status of an adjacent wheel of the vehicle.

With the foregoing and other purposes in view my invention consists in the details of construction and in the arrangement and combination of parts to be hereinafter more fully described and particularly pointed out in the appended claims. In describing my invention in detail reference will be had to the accompanying drawing wherein like characters of reference denote corresponding parts in the several views, and in which—

Fig. 1 is a front elevation of a fragment of an automobile axle and a supporting wheel showing my invention applied and with the latter disposed in locked relation to the wheel;

Fig. 2, a plan view of my lock detached;

Fig. 3, a section on the line 3—3 of Fig. 1; and

Fig. 4, a section on the line 4—4 of Fig. 3.

Referring to the drawing A indicates the front axle of an automobile, B the steering knuckle, and C the wheel associated with the knuckle.

My improved lock is shown as comprising a U-shaped member D including arms 10 and 11. This member is first disposed in embracing relation to the axle A and I then secure to the free ends of the arms 10 and 11 tubular members 12 and 13 respectively. The attachment of the members 12 and 13 to the arms 10 and 11 is accomplished by means of threaded studs 14 and 15 which are screwed into recesses 16 and 17 formed in the free ends of the arms 10 and 11. My improved lock further embodies a chain 18 which is slidably engaged in the tubular members 12 and 13, said chain being held against disengagement from the members 12 and 13 by means of rings 19 secured respectively to the ends of the chain. Surrounding that portion of the chain 18 on the end of the members 12 and 13 remote from the wheel C is a spiral spring 20 which abuts the members 12 and 13 respectively at its ends and serves to normally hold the chain 18 in the position shown in Fig. 4.

In order to support the chain and spring 20 I provide a tubular casing 21 having one end partially closed by a central filler 22 which forms cylindrical passages 23 and 24 which receive the tubular members 12 and 13 respectively and directly above these passages I slot the casing 21 as at 25 and 26, said slots receiving the arms 10 and 11 of the member D as will be obvious. When the casing 21 is applied it is secured in place by means of screws 27. The entire structure is then locked against movement on the axle A by means of a binding screw 28, which latter is mounted in the arm connecting portion of the member D.

In operating the lock so as to secure the wheel C against rotation the ends of the chain 18 are pulled toward the wheel C against the influence of the spring 20 and a suitable lock 29 is then employed by passing its shackle around one of the spokes of the wheel C and then through the rings 19.

While I have shown the anchoring element employed in my locking device as a chain it will be obvious that a U-shaped rod could also be employed in lieu thereof or any other suitable anchoring element that would meet the conditions disclosed in the operation of my invention.

While I have illustrated and described one particular form of carrying my invention into practice it will be obvious that various changes in details and proportions can be resorted to without departing from the scope thereof as set forth in the appended claims.

I claim:

1. A vehicle lock comprising a member adapted to be secured to the axle of a vehicle in proximity to a supporting wheel, said member having a pair of parallel passages therein, an anchoring element having its end portions slidable in said passages respectively and held against disengagement from the member, spring means constantly tending to hold said element at the limit of its movement in one direction, and a lock engageable with the ends of the element to connect the same with an adjacent wheel.

2. A vehicle lock comprising a member adapted to be secured to the axle of a vehicle in proximity to a supporting wheel, said member having a pair of parallel passages therein, an anchoring chain slidably engaged in both of said passages and held against disengagement from the member, spring means constantly tending to hold said chain at the limit of its movement in one direction, and a lock engageable with both ends of the chain to connect the same with an adjacent wheel.

3. A vehicle lock comprising a member adapted to be secured to the axle of a vehicle in proximity to a supporting wheel, said member having a pair of parallel passages therein, an anchoring chain slidably engaged in both of said passages and held against disengagement from the member, a coil spring surrounding the chain and bearing at its ends against the member to normally hold said chain at the limit of its movement in one direction, and a lock engageable with both ends of the chain to connect the same with an adjacent wheel.

4. A vehicle lock comprising a U-shaped member adapted to be secured to the axle of a vehicle in proximity to a supporting wheel, tubular elements secured to the free ends of the arms of said member, an anchoring chain slidably engaged through both of said elements and held against disengagement therefrom, a coil spring surrounding the chain and bearing at its ends against the elements respectively to normally hold said chain at the limit of its movement in one direction, and a lock engageable with both ends of the chain to connect the same with an adjacent wheel.

5. A vehicle lock comprising a member adapted to be secured to the axle of a vehicle in proximity to a supporting wheel, said member having a pair of parallel passages therein, an anchoring chain slidably engaged in both of said passages and held against disengagement from the member, a coil spring surrounding the chain and bearing at its ends against the member to normally hold said chain at the limit of its movement in one direction, a tubular element secured to the member and receiving and supporting both the chain and spring when they are in normal position, and a lock engageable with both ends of the chain to connect the same with an adjacent wheel.

6. In a locking device for vehicles, a casing provided with a longitudinally extending spring, means connected to said spring adapted to be connected with a wheel and be kept taut and extended within said casing by the longitudinally extending spring and means for locking said means to a wheel.

Witness this my signature this the first day of November, 1919.

TOMASO J. WILLETT.

Witnesses:
T. L. BLOCK,
JOHN OHR.